US008585901B1

(12) United States Patent
Lenger et al.

(10) Patent No.: US 8,585,901 B1
(45) Date of Patent: Nov. 19, 2013

(54) METHOD OF CONTINUOUS IN-SITU TRIGLYCERIDE STABILIZATION AND SULFUR REDUCTION OF FOG (FATS, OIL AND GREASE) TO OPTIMIZE FUEL EXTRACTION

(71) Applicants: Markus Johannes Lenger, Capistrano Beach, CA (US); Gina Helen Lenger, Capistrano Beach, CA (US)

(72) Inventors: Markus Johannes Lenger, Capistrano Beach, CA (US); Gina Helen Lenger, Capistrano Beach, CA (US)

( * ) Notice: Subject to any disclaimer, the term of this patent is extended or adjusted under 35 U.S.C. 154(b) by 0 days.

(21) Appl. No.: 13/750,993

(22) Filed: Jan. 25, 2013

(51) Int. Cl.
*C02F 3/00* (2006.01)
(52) U.S. Cl.
USPC ............ 210/610; 210/615; 210/620; 210/629
(58) Field of Classification Search
USPC ......... 210/610, 615, 620, 629, 150, 220, 538, 210/916
See application file for complete search history.

(56) References Cited

U.S. PATENT DOCUMENTS

| | | | |
|---|---|---|---|
| 4,214,887 A | | 7/1980 | van Gelder |
| 5,296,111 A | * | 3/1994 | Suzuki et al. ................. 210/611 |
| 6,187,193 B1 | * | 2/2001 | Ozama .......................... 210/608 |
| 7,029,588 B2 | | 4/2006 | Owens |
| 7,416,668 B1 | | 8/2008 | Theodore |
| 7,485,230 B2 | | 2/2009 | Magner et al. |
| 7,597,809 B1 | | 10/2009 | Roberts |
| 7,833,414 B2 | | 11/2010 | Magner et al. |
| 7,871,448 B2 | | 1/2011 | Jackam et al. |
| 8,097,049 B2 | | 1/2012 | Munson et al. |
| 8,123,822 B2 | | 2/2012 | Morgan |
| 8,123,944 B2 | | 2/2012 | Haase et al. |
| 8,124,572 B2 | | 2/2012 | Miller |
| 2004/0182793 A1 | | 9/2004 | Owens |
| 2007/0045182 A1 | | 3/2007 | Chapin |
| 2007/0108125 A1 | * | 5/2007 | Cho et al. ...................... 210/605 |
| 2007/0170113 A1 | * | 7/2007 | Lenger et al. ................. 210/608 |
| 2008/0066374 A1 | | 3/2008 | Herskowitz |
| 2008/0203014 A1 | | 8/2008 | Magner et al. |
| 2008/0250831 A1 | | 10/2008 | Rogers |
| 2009/0088351 A1 | | 4/2009 | Miller |
| 2009/0314709 A1 | | 12/2009 | Magner et al. |
| 2010/0163483 A1 | | 7/2010 | Grady et al. |

(Continued)

FOREIGN PATENT DOCUMENTS

BR          0705895-0       12/2007

OTHER PUBLICATIONS

Gerpen et al; Biodiesel Production Technology Aug. 2002-Jan. 2004; pp. 1-106; Jul. 2004; National Renewable Energy Laboratory; Boulder Co.

(Continued)

*Primary Examiner* — Chester Barry

(57) ABSTRACT

A method for continuous in-situ triglyceride stabilization in FOG (Fats, Oil and Grease) commonly referred to as trap grease. The stabilization is achieved by eliminating hydrolysis and thus preventing the BTU rich triglycerides breaking down into free fatty acids (FFA) or the formation of mono- and diglycerides. A closed loop aeration and recirculation of the FOG ensures sufficient dissolved oxygen not only arresting hydrolysis but also eliminating the formation of hydrogen sulfide. The method furthermore employs the formation and continuing functioning of a biofilm for the microbiological reduction of the FOG's sulfur content. A low FFA/high triglycerides concentration as well as sulfur reduction is highly desirable, allowing for easy biodiesel fuel conversion or biogasification. The resulting biofuel does not exhibit the typical hygroscopic property found in B100 biodiesel.

10 Claims, 1 Drawing Sheet

(56) References Cited

U.S. PATENT DOCUMENTS

| | | |
|---|---|---|
| 2011/0197497 A1* | 8/2011 | Jiang .................... 44/307 |
| 2011/0289828 A1 | 12/2011 | Eisner et al. |
| 2012/0030993 A1 | 2/2012 | Crosier et al. |
| 2012/0034594 A1 | 2/2012 | Semrau et al. |
| 2012/0073187 A1 | 3/2012 | Mancini et al. |
| 2012/0093698 A1 | 4/2012 | Morgan |
| 2012/0123139 A1 | 5/2012 | Munson et al. |
| 2012/0123140 A1 | 5/2012 | Jackam et al. |
| 2012/0157699 A1 | 6/2012 | Kozyuk et al. |
| 2012/0167454 A1 | 7/2012 | Brandvold et al. |
| 2012/0240452 A1 | 9/2012 | Erdoes, Jr. et al. |
| 2012/0325740 A1 | 12/2012 | Kruglick |

OTHER PUBLICATIONS

Tyson, Brown Grease Feedstocks for Biodiesel, WWW domain nrel.gov, 2002, pp. 1-33; National Renewable Energy Technology, CO.

Admin in Biodiesel Chill Services LLC "Building a better Grease Trap for Biodiesel Production" Jan. 18, 2010 WWW domain http://www.chillservices.com/?p=236.

Be Sewer Smart Summit Oct. 25th, 2011 "FOG-to-Biodiesel Demonstration Project" San Francisco.

Admin in Biodiesel Chill Services LLC "Building a better Grease Trap for Biodiesel Production" Jan. 18 2010 WWW domain http://www.chillservices.com/?p=236.

* cited by examiner

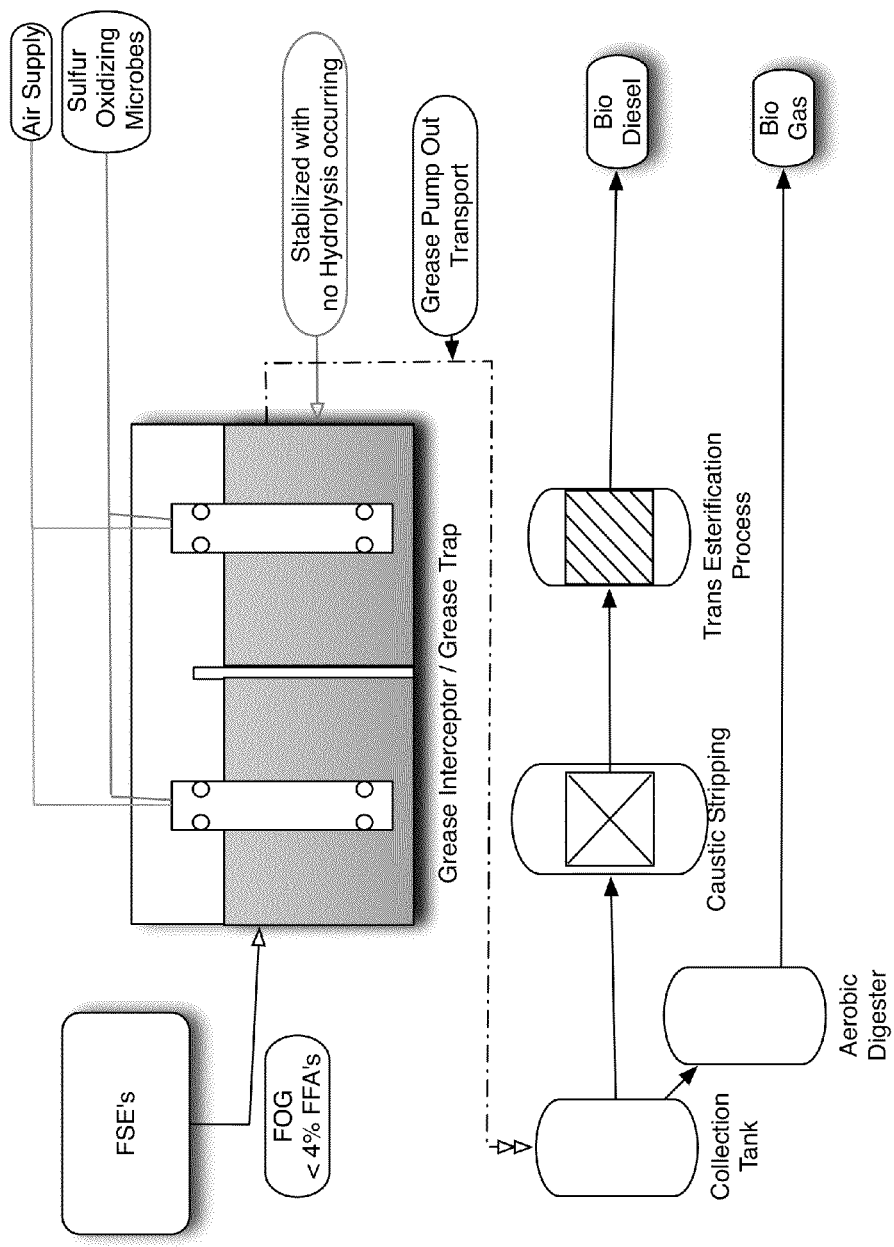

METHOD OF CONTINUOUS IN-SITU TRIGLYCERIDE STABILIZATION AND SULFUR REDUCTION OF FOG (FATS, OIL AND GREASE) TO OPTIMIZE FUEL EXTRACTION

CROSS-REFERENCE TO RELATED APPLICATIONS

This application claims the benefit of provisional patent application Ser. No. 61/590,706 filed 2012 Jan. 25 by the present inventors.

FEDERALLY SPONSORED RESEARCH

Not Applicable

SEQUENCE LISTING OR PROGRAM

Not Applicable

BACKGROUND

1. Field of Invention

This invention relates to wastewater and solid treatment, specifically the extraction of biofuels from Grease and Biosolids.

We have invented a novel method to stabilize triglycerides in FOG (Fats, Oil and Grease) commonly referred to as trap grease. This stabilization is achieved inside the grease interceptor or grease trap, therefore representing an in-situ process. Stabilization is achieved by arresting hydrolysis thus preventing the BTU-rich triglycerides breaking down into free fatty acids (FFA). Applicant's invention treats (stabilizes) the FOG content considered solid waste and not the wastewater content. This distinction is important as other methods know in the art treat the wastewater to achieve required discharge parameters but do not address the treatment (stabilization) of solid waste to produce a usable product such as fuel. A low FFA concentration as well as sulfur reduction is highly desirable, allowing for easy biodiesel fuel conversion or biogasification. Although this invention is perfectly capable of being used as a stand-alone embodiment, it was tested non-commercially over the last year together with a device for in-situ bioremediation of liquid waste (U.S. Pat. No. 7,615,156 granted on Oct. 10, 2009) to establish a reduction to practical application. The details of the system have neither been published, shown to the public nor sold as of this filling.

2. Background of the Invention

Construction and performance of Grease Interceptors (GI) and Grease Traps (GT) are regulated by ASME and ANSI standards A112 14.6 2010 and Z1001. The difference between a GI and GT is defined by ANSI as follows: While a GI and a GT are similar in function, they are distinguished by their size and location of install. GT's are smaller and range from 10 to 500 gallon in capacity and are usually installed in the kitchen under the sink. GI's are larger structures installed under ground and a size larger than 500 gallons. It is a requirement of the A112 14.6 standard to not introduce any device into a GI or GT that alters the "flow and separation characteristics" of the GI/GT. This requires any treatment of the contained FOG to not alter the critical base functions of a GI/GT.

The National Renewable Energy Laboratory (NREL), among other reputable information sources, published technical assertions on the method and viability of extracting fuel (biodiesel) from trap grease, also known as FOG or browngrease. While yellow-grease (used fryer oil etc.) is comparatively easy to recycle due to its low free fatty acid content (4% to 15%), commercial fuel extraction of brown-grease has been most difficult due to the chemical makeup of the trap grease and its sulfur content. A method to pretreat browngrease to overcome those difficulties would be most desirable. According to the NREL study titled "Urban Waste Grease Resource Assessment", each US resident produces 13.37 pounds of brown-grease per year resulting in 4-billion pounds of brown-grease produced annually. Given the proper methodology as well as technology an estimated 945-million gallons of biodiesel could be created annually.

NREL states that the Free Fatty Acid (FFA) content in brown-grease ranges from 50% to 100%. This high FFA concentration is generated when triglycerides break down to their individual molecular strands, known as monoglycerides, through a process known as hydrolysis. Triglycerides contain much more BTU per weight than FFAs. The technical and capital requirements to turn FFAs into biodiesel or to separate FFAs and triglycerides are enormous and represent, so far, an insurmountable barrier to widespread commercialization. The conversion of triglycerides to biodiesel is much simpler and is achieved by a process called transesterification. However, FFA contents above 4% create a loss of clean oil yield that increases with FFA concentration. A 10% FFA concentration can result in a 30%-plus yield loss. Transesterification can typically handle only <4% FFA content and requires a process called caustic stripping. Four percent to 20% FFA concentration uses a 2-step process called acid esterification and subsequent base esterification. This method is expensive, complex and energy intensive. Brown-grease, when delivered to a processing plant, contains 50% to 100% FFAs, and as of this writing technologies that can achieve partial biodiesel conversion currently exist only in small pilot plant form. According to the NREL there is no proven technology above 50% FFA mixes. As it becomes evident a modification of the brown-grease FFA content is desirable. When grease in the form of FOG is discharged from FSEs (Food Service Establishments) into a GI/GT the FFA content is well below 4%. FFAs form with the hydrolysis that occurs inside a GI/GT. Said hydrolysis is enabled by the anaerobic conditions inherent inside a GI/GT. Anaerobic and chemical microbial activities cause the breakdown of the triglycerides into FFAs whilst releasing hydrogen sulfide, which in turn acidifies the GI/GT content thus accelerating hydrolysis and the destruction of the BTU rich triglycerides. However, hydrolysis will not occur if the GI/GT is kept in a continuous aerobic state. Thus an aeration method sufficient enough to evenly distribute and recirculate the entire GI/GT content of both water and FOG to maintain a dissolved oxygen level of >0.5 mg/l will arrest virtually all hydrolytic reactions in said GI/GT. It is important to point out that said dissolved oxygen level of >0.5 mg/l must also be achieved in the FOG content to prevent hydrolysis. However, due to the above mentioned ANSI requirements the aeration method and technology must be capable of dissolving enough oxygen while not interfering with the inherent functions of a GI/GT. One such method is one of the applicants' earlier inventions U.S. Pat. No. 7,615, 156 "device for in-situ bioremediation of liquid waste". This technology has also been certified to be compliant with the above-mentioned ANSI Standard. For the purpose of explaining our methodology applicants will refer to the above-mentioned patented device as means for aeration and biological treatment. However, this should not be construed as a limitation, as any aeration device suitable whilst still fulfilling the Standards requirement, can be used.

PRIOR ART

The following is a tabulation of some prior art that presently appears relevant U.S. patent application Publications

| Publication Number | Kind Code | Publ. Date | Applicant |
|---|---|---|---|
| 20100163483 | A1 | Jul. 01, 2010 | Grady; Michael; et al. |
| 20110289828 | A1 | Dec. 01, 2011 | Eisner; Peter; et al. |
| 20090088351 | A1 | Apr. 02, 2009 | Miller; Stephen J. |
| 20080066374 | A1 | Mar. 20, 2008 | Herskowitz; M. |
| 20120240452 | A1 | Sep. 27, 2012 | Erodes,JR.; K; et al. |
| 20120157699 | A1 | Jun 21, 2012 | Kozyuk; Oleg; et al. |
| 20120123140 | A1 | May 17, 2012 | Jackam; John; et al. |
| 20120123139 | A1 | May 17, 2012 | Munson; James; et al. |
| 20120093698 | A1 | Apr. 19, 2012 | Morgan; William D. |
| 20120073187 | A1 | Mar. 29, 2012 | Mancini; Tara; et al. |
| 20120030993 | A1 | Feb. 09, 2012 | Croisier; R.; et al. |
| 20110197497 | A1 | Aug. 18, 2011 | Jiang; Rong |
| 20090314709 | A1 | Dec. 24, 2009 | Magner; J; et al. |
| 20080250831 | A1 | Oct. 16, 2008 | Rogers; Ralph; et al. |
| 20040182793 | A1 | Sep. 23, 2004 | Owens, Samuel R. |
| 20120167454 | A1 | Jul. 05, 2012 | Brandvold; T.; et al. |

Biofuel and Biodiesel have enjoyed varying popularity depending on fuel prices. Whenever fuel costs increase interest in biofuel rises accordingly. As of late environmental concerns and the growing movement and political will of fuel independence has spurred a renewed interest in these types of fuels. Fuels that can be derived from waste products such as grease or animal feed stock are ideologically the most desirable but are also the most difficult to produce. Several methods are known in the arts to produce such fuels and the inventors will compare their approach to existing prior art to demonstrate their inventions' unobviousness and novelty.

U.S. Patent Publication 2010/0163483 by Michael Grady et al. "Food Processing Resource Recovery", published 2010 Jul. 1 discusses a method to bond peptides in waste inside a Dissolved Air Flotation (DAF) by adjusting the pH and incubating a lytic agent increasing oil extraction from wastewater streams. Nowhere does Grady et al. discuss fuel stabilization or sulfur reduction. Grady et al. relies on chemical additives and hydrolysis of peptide bonds, not the grease itself. No biological treatment is discussed.

U.S. Patent Publication 2011/0289828 by Peter Eisner et al. "Liquid Biofuel Made of Esters and Bound Glycerides, and also Process for Production Thereof", published 2011 Dec. 1 discusses a partial transesterification of triglycerides requiring a specific ratio of the glycerides that produces a fuel additive only. Nowhere does Eisner et al. discuss fuel stabilization or sulfur reduction, nor is biological treatment discussed. Inventor's method offers only pretreatment, stabilization and optimization and does not produce a final fuel.

U.S. Pat. No. 8,124,572 by Stephen J. Miller "Production of Biofuels and Biolubricants from a Common Feedstock", issued 2012 Feb. 28 discusses methods and systems for processing triglyceride-containing, biologically-derived oils. While Miller describes biologically-derived oils his approach is to form free fatty acids and separate them by type. Inventor's method prevents the formation of free fatty acids. Nowhere does Miller discuss fuel stabilization or sulfur reduction. Inventor's method offers only pretreatment, stabilization and optimization and does not produce a final fuel.

U.S. Patent Publication 2008/0066374 by Herskowitz "Reaction System for Production of Diesel Fuel from Vegetable and Animal Oil", published 2008 Mar. 20 discusses fuel production from vegetable or animal oil using a tubular reaction unit containing a catalyst made from acidic and metallic components. The process further requires pressure and heating to 300 to 450 degrees Celsius. Inventors' method requires neither heat nor pressure and it does not require a catalyst. Inventor's method offers only pretreatment, stabilization and optimization and does not produce a final fuel. Nowhere does Herskowitz discuss fuel stabilization or sulfur reduction, nor is biological treatment discussed.

U.S. Patent Publication 2012/0240452 by Erodes J R. et al. "Production of Biodiesel Fuels", published 2012 Sep. 27 discusses a process and apparatus for the production of improved biodiesel fuel from feedstock's containing both fatty acids and glycerides by reactive distillation. Erodes J R et al. requires reaction trays within a distillation column, partial vacuum and an electric field sufficient to induce electrostatic coalescence of the glycerin. Inventors' method requires neither partial vacuum nor an electric field sufficient to induce electrostatic coalescence. Inventors method offers only pretreatment, stabilization and optimization and does not produce a final fuel. Nowhere does Erodes J R et al. discuss fuel stabilization or sulfur reduction, nor is biological treatment discussed.

U.S. Patent Publication 2012/0157699 by Oleg Kozyuk et al. "Process for Production of Biodiesel", published 2012 Jun. 21 discusses a three-stage transesterification reaction for preparing biodiesel, using at least one high-shear cavitation reactor and two low-shear cavitation reactors. Inventors' method does not require any cavitation reactor and is a single stage system. Nowhere do Kozyuk et al. discuss fuel stabilization or sulfur reduction, nor is biological treatment discussed.

U.S. Pat. No. 7,871,448 by John Jackam et al. "Production of Biodiesel and Glycerin from High Free Fatty Acid Feedstocks", issued 2011 Jan. 18 discusses the conversion of free fatty acids to glycerides and the subsequent conversion of glycerides to glycerin and biodiesel using transesterification of a glyceride stream with an alcohol. Inventors' method does not convert free fatty acids to glycerides nor does it add alcohol. Inventor's method offers only pretreatment, stabilization and optimization and does not produce a final fuel. Nowhere do Jackam et al. discuss fuel stabilization or sulfur reduction, nor is biological treatment discussed.

U.S. Patent Publication 2012/0123139 by James Munson et al. "Biodiesel Purification by a Continuous Regenerable Adsorbent Process", published 2012 May 17 describes the use of a powdered, granulated or extruded ion-exchange adsorbent contained in a column system using a solvent. Inventors' method does not require an ion-exchange adsorbent nor a solvent. Nowhere do Munson et al. discuss fuel stabilization or sulfur reduction, nor is biological treatment discussed.

U.S. Patent Publication 2012/0093698 by William Morgan "Production of Biodiesel Fuels Which are Low in Glycerin and Sulfur", published 2012 Apr. 19 describes a two stage reaction vessel, an alcohol vapor system and a heterogeneous ion exchange resin catalyst and the need to remove impurities from the fatty acid alkyl ester. Inventors' method requires neither a reaction vessel, an alcohol vapor system nor does it require a catalyst. Inventor's method offers only pretreatment, stabilization and optimization and does not produce a final fuel. Nowhere does Morgan discuss fuel stabilization or biological treatment.

U.S. Patent Publication 2012/0073187 by Tara Mancini et al. "Process for Continuous Production of Biodiesel from Fatty Acids Containing Feedstocks", published 2012 Mar. 29 discusses contacting the raw material with glycerol and a Lewis acid catalyst in a first reaction chamber at a selected pressure and temperature and separating water from the mixture product in a gas phase; and contacting the mixture product with a second alcohol and an alkali catalyst in a second reaction chamber. Inventor's method does neither require a reaction vessel, a Lewis acid catalyst nor does it require a selected pressure and temperature. Inventor's method offers only pretreatment, stabilization and optimization and does not produce a final fuel. Nowhere does Morgan discuss fuel stabilization or biological treatment.

U.S. Patent Publication 2012/0030993 by Croisier et al. "Brown Grease Separator", published 2012 Feb. 9 discusses a heating system to promote waste grease stratification by providing the combustion of brown grease itself. It requires the brown grease to adjust viscosity within a thermally conditioned holding vessel so that it may be drawn through one or more pumps to increase pressure for atomization in a boiler. Inventor's method requires neither heat, a holding vessel and boiler nor does it require adjustment of viscosity. Inventors' method offers only pretreatment, stabilization and optimization and does not produce a final fuel. Nowhere do Croisier et al. discuss fuel stabilization or sulfur reduction, nor is biological treatment discussed.

U.S. Patent Publication 2011/0197497 by Rong Jiang "Brown Grease Treatment Process", published 2011 Aug. 18 discusses a process comprising simultaneously transporting and heating the source of brown grease through a heated metal pipeline, and separating the lipid component comprising brown grease from other components in the source of brown grease. Furthermore the process uses steam, centrifugation, pH adjustment and an oxidizing agent. Inventors' method neither requires heat, steam centrifugation, pH adjustment nor does it require an oxidizing agent. Inventors' method offers only pretreatment, stabilization and optimization and does not produce a final fuel. Nowhere does Jiang discuss fuel stabilization or sulfur reduction, nor is biological treatment discussed.

U.S. Pat. No. 7,833,414 by Magner et al. "Polar FOG Waste Treatment", issued 2010 Nov. 16 discusses a slipstream loop incorporating circulation pumps, heat exchangers and anaerobic digesters for continuously circulating and actively digesting sludge. It requires heating, a secondary digester, at least one mixing chopper pump and mixing it with digested sludge and disposal at a waste treatment system having anaerobic digesters for digestion of solids. Magner et al. does not discuss fuel production, sulfur reduction or fuel stabilization. Inventors method neither requires heat, a secondary digester, a mixing chopper pump nor does it require mixing with digested sludge. Inventor's method allows fuel production contrary to Magner et al.

U.S. Patent Application 20080250831 by Rogers; Ralph; et al. "Treatment of Brown Grease", published 2008 Oct. 16 discusses a method of adjusting the pH of brown grease and adding a anionic copolymer treatment mixture along with a cationic copolymer to form a reaction mixture. The resulting solids are processed further into a fuel or soil additive. Inventor's method neither requires pH adjustment nor does it require adding polymers. Nowhere do Rogers et al. discuss fuel stabilization or sulfur reduction, nor is biological treatment discussed.

U.S. Patent Publication 2008/0250831 by Ralph Rogers et al. "Treatment of Brown Grease", published 2008 Oct. 16 discusses a method of adjusting the pH of brown grease and adding a an anionic copolymer treatment mixture along with a cationic copolymer to form a reaction mixture. The resulting solids are processed further into a fuel or soil additive. Inventors' method neither requires pH adjustment nor does it require adding polymers. Nowhere do Rogers et al. discuss fuel stabilization or sulfur reduction, nor is biological treatment discussed.

U.S. Patent Publication 2012/0167454 by Brandvold et al. "Pretreatment of Fats and Oils in the Production of Biofuels", published 2012 Jul. 5 discusses a method for treating a feedstock comprising a fatty acid or triglyceride containing components. It requires the use of an ion exchange resin or with a macroreticulated, strong acid cation exchange resin to provide a treated feedstock. The final biofuel requires blending with petroleum-derived fuel. Inventors' method neither requires ion exchange resin nor does it require a macroreticulated, strong acid cation exchange resin. No blending with petroleum-derived fuel is required. Nowhere do Brandvold et al. discuss fuel stabilization or sulfur reduction, nor is biological treatment discussed.

An extensive search has found no prior art describing any methodology of optimizing brown-grease inside the GI/GT.

DETAILED DESCRIPTION OF THE INVENTION

The following steps detail the method:
1. Closed Loop Aeration. A method of aerating and recirculating the contents of a GI/GT sufficiently to maintain dissolved oxygen level of 0.5 mg/l or higher. Said method may not interfere with the separation characteristics of a GI/GT, such as interference in layer separation, interference in gravity separation, bypassing grease or solids, emulsifying grease or promoting a channeling effect. Inventors are currently only aware of one method to achieve this and that is Lenger et al.—U.S. Pat. No. 7,615,156.
2. Stabilization of Triglycerides. If a consistent dissolved oxygen level of 0.5 mg/l or more is present hydrolysis will not occur thus preserving the triglycerides and therefore the BTU/fuel value of the brown-grease. Without aeration, hydrolysis would begin almost immediately raising the Free Fatty Acid (FFA) content above 50% in as little as 12-hours. Inventor's method prohibits such hydrolysis and formation of FFAs by sustaining aeration and recirculation until GI/GT is excavated by pumping and the brown-grease is transferred to an appropriate recycling facility capable of producing biodiesel. Due to the prevention of hydrolysis the extracted fuel will mainly contain triglycerides with little or no mono- and diglycerides rendering it therefore also non-hygroscopic, meaning it will not attract moisture from the atmosphere producing a biofuel with low water content. This biofuel would exceed the B100 Biodiesel standard for water content.
3. Biological Treatment. One of the Inventors prior inventions U.S. Pat. No. 7,615,156 Lenger et al. also allows the injection, growth and continuing function of a biofilm within the device. Inventors are utilizing sulfur-oxidizing microbes such as Archaea and Bacteria. As such thiosulfate-oxidizing bacteria such as *Thiobacillus* sp. and *Alcaligenes* sp. will further enhance the quality of the brown-grease by drastically reducing its sulfur content. Above mentioned microbes have been successfully used but should not be construed as a limitation as any suitable microorganism may be used to reduce the sulfur. Such a reduction not only increases the quality of fuel obtained during the transesterification process and enabling the application of a simpler chemical process during the biodiesel generation but also significantly reduces the potential of hydrogen sulfide formation in the GI/GT. This further assures that no destructive hydrolysis occurs. An added benefit of preventing the formation of hydrogen sulfide, a highly corrosive and toxic gas, is the drastically increased lifespan of the GI/GT and the sewer systems 4. A monitoring system, such as one of the inventors U.S. Pat. No. 8,471,725 titled "Methods and Supporting Telemetry to Determine, Monitor and Control the Metagenomic and Physical States of Grease Interceptors, FOG's, Vaults and other Waste Collecting Enclosures" may be used to inform the biofuel processor that the grease has reached the maximum allowable grease level as dictated by local grease ordinance (typically 25% of the GI capacity) and can be excavated by pumping. Since only the grease content has to be excavated the trap is left with greasy water.

5. Additionally if a grease bioremediation device, such as one of the Inventors prior inventions U.S. Pat. No. 7,615,156 Lenger et al. is used it can enter a bioremediation mode, to clean the remaining greasy water in GI/GT. It would require temporarily suspending the injection of said sulfur oxidizing microbes and injecting grease reducing microbes such as, but not limited to *Bacillus megaterium, Bacillus subtilis, Bacillus licheniformis, Pseudomonas fluoresens* and *Bacillus amyloliquefaciens*. Once the water quality has improved to the desired level or as stipulated by local discharge ordinance the system can be put back into "fuel stabilization mode" by suspending injection of grease reducing microbes and resuming with the sulfur oxidizing microbe's injection. Sufficient water quality can either be established by manual inspection, an automated system, set time intervals or the use of a monitoring system such as one of the inventors U.S. Pat. No. 8,471,725 titled "Methods and Supporting Telemetry to Determine, Monitor and Control the Metagenomic and Physical States of Grease Interceptors, FOG's, Vaults and other Waste Collecting Enclosures".

1. Odor Reduction. Brown-grease is infamous for its foul smelling odor. This odor is present not only in the GI/GT but during pumping, transport and processing. Keeping a GI/GT in an aerobic state prohibits formation of anaerobic activities being the main cause of foul odor formation. This is an added benefit to the FSE operators and eliminates the addition of expensive odor suppressants, filters and other means of odor mitigation.

DRAWINGS

We have included one drawing sheet explaining the process.

FIG. 1: Process Flow Diagram

ADVANTAGES

Inventor's novel approach eliminates the need for the usual pressure heat treatment and dramatically increases the yield of usable fuel. Current approaches in the art are trying to repair the damage to the hydrocarbon fuel chains done by the occurring hydrolysis in GI/GT's. Inventor's method prevent hydrolysis and thus degradation of the extractable fuel. Fuel stabilization occurs as soon as FOG enters the GI/GT. Maintaining an aerobic state eliminates odor and toxic and corrosive gases and drastically extends the life of the infrastructure. It enables the production of a far superior biofuel at a substantially lower cost. It saves resources and chemicals otherwise needed in the production of biofuels. Inventor's method leverages sustainable water management practices and creates renewable fuels from waste.

CONCLUSIONS, RAMIFICATIONS, AND SCOPE

Thus the reader will see that at least one embodiment of our method provides a novel and unobvious way to stabilize the fuel contained in FOG in Grease interceptors, grease traps and grease vaults while biologically reducing the sulfur content of the fuel component. A periodic replenishment of microbial cultures enables to maintain the continuous bioremediation, even if harsh, antiseptic or toxic chemicals or cleaners are disposed of in the FSE (Food Service Establishment) and enter the grease interceptors, grease traps or grease vaults.

While my above description contains many specificities, these should not be construed as limitations on the scope of the invention, but rather as an exemplification of one or several preferred embodiments thereof. Many other variations are possible. For example the same method can be used in wastewater treatment plants, animal feedstock and food and meat rendering plants. Alternatively the same methodology can be applied at brown-grease storage facilities at the processing plants to maintain low FFA content. The same methodology can also be used to turn brown-grease into a biogas.

Thus the scope of the embodiment should be determined by the appended claims and their legal equivalents, rather than by the example given.

We claim:

1. A method of continuous in-situ triglyceride stabilization of FOG (fats, oil and grease) inside grease interceptors (GI), grease traps (GT) and other brown grease storage facilities and processing plants to optimize fuel extraction comprising of the following elements:
   (a) closed loop aerating and continuous recirculation of the entire contents of a GI/GT;
   (b) said closed loop aeration to evenly distribute the oxygen throughout both water and FOG
   (c) allowing the formation and continuing functioning of a biofilm;
   (d) stabilizing triglycerides by arresting hydrolysis and;
   (e) arresting the formation of free fatty acids (FFA's);
   (f) microbiologically reducing FOG sulfur content;
   Whereby the fuel content and quality will be stabilized to optimize subsequent fuel extraction and means of reducing inherent sulfur content.

2. The method of claim 1 wherein said closed loop aeration is sufficient to maintain a dissolved oxygen level of 0.5 mg/l or higher in both water and FOG.

3. The method of claim 2 wherein said dissolved oxygen level is arresting hydrolysis in water and FOG.

4. The method of claim 3 wherein said arrested hydrolysis is stabilizing the triglycerides contained in the FOG.

5. The method of claim 3 wherein said arrested hydrolysis is preventing the formation of mono- and di-glycerides.

6. The method of claim 3 wherein said arrested hydrolysis is preventing the additional formation of free fatty acids (FFA's).

7. The method of claim 1 wherein biofilm is exposed to the FOG and closed loop aeration.

8. The method of claim 1 wherein said formation and continuing functioning of a biofilm consists of sulfur oxidizing microbes such as archaea and bacteria.

9. The method of claim 8 wherein said microbiological reduction of the FOG sulfur content is achieved utilizing said biofilm.

10. The method of claim 1 wherein formation of hydrogen sulfide is eliminated.

* * * * *